July 2, 1957 F. LYIJYNEN 2,797,437
MOLDING APPARATUS
Original Filed April 17, 1946 4 Sheets-Sheet 2
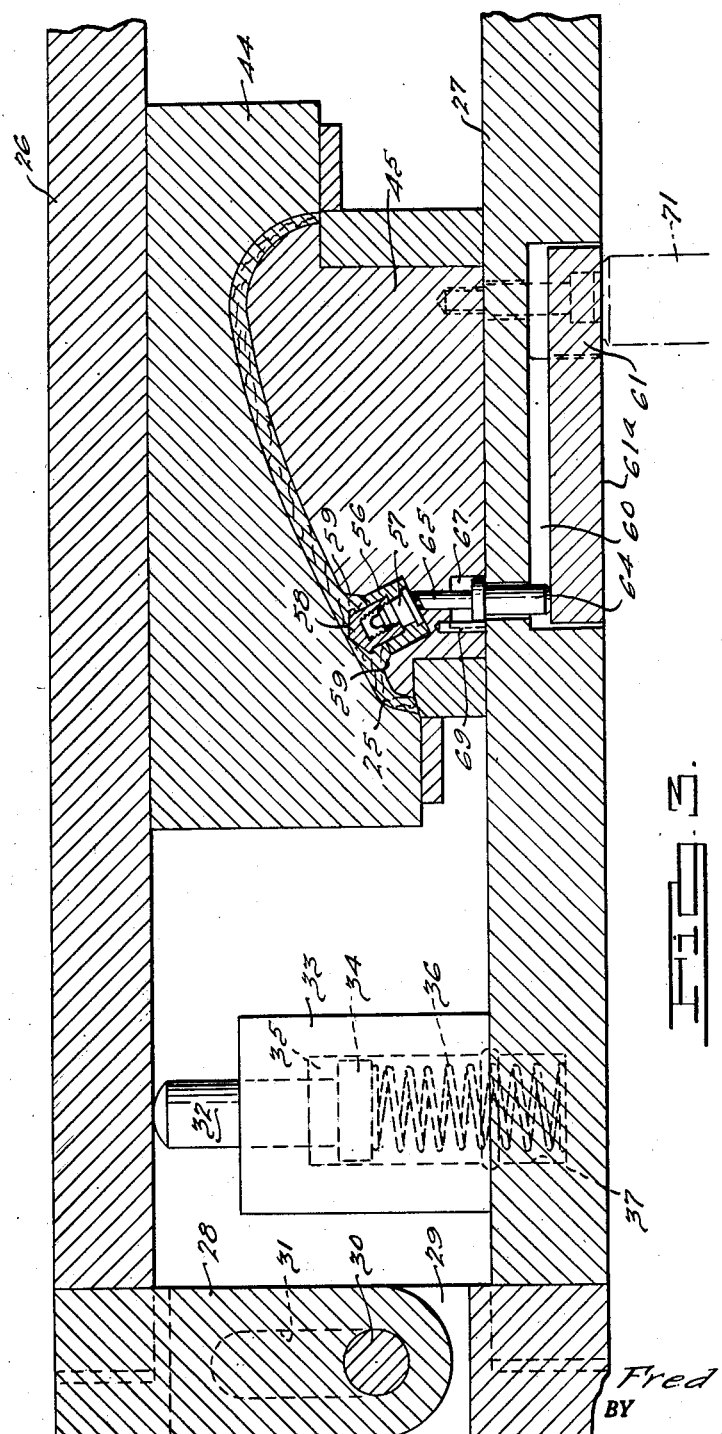
INVENTOR.
Fred Lyijynen.
BY
Elmer Jamison Gray
ATTORNEY.

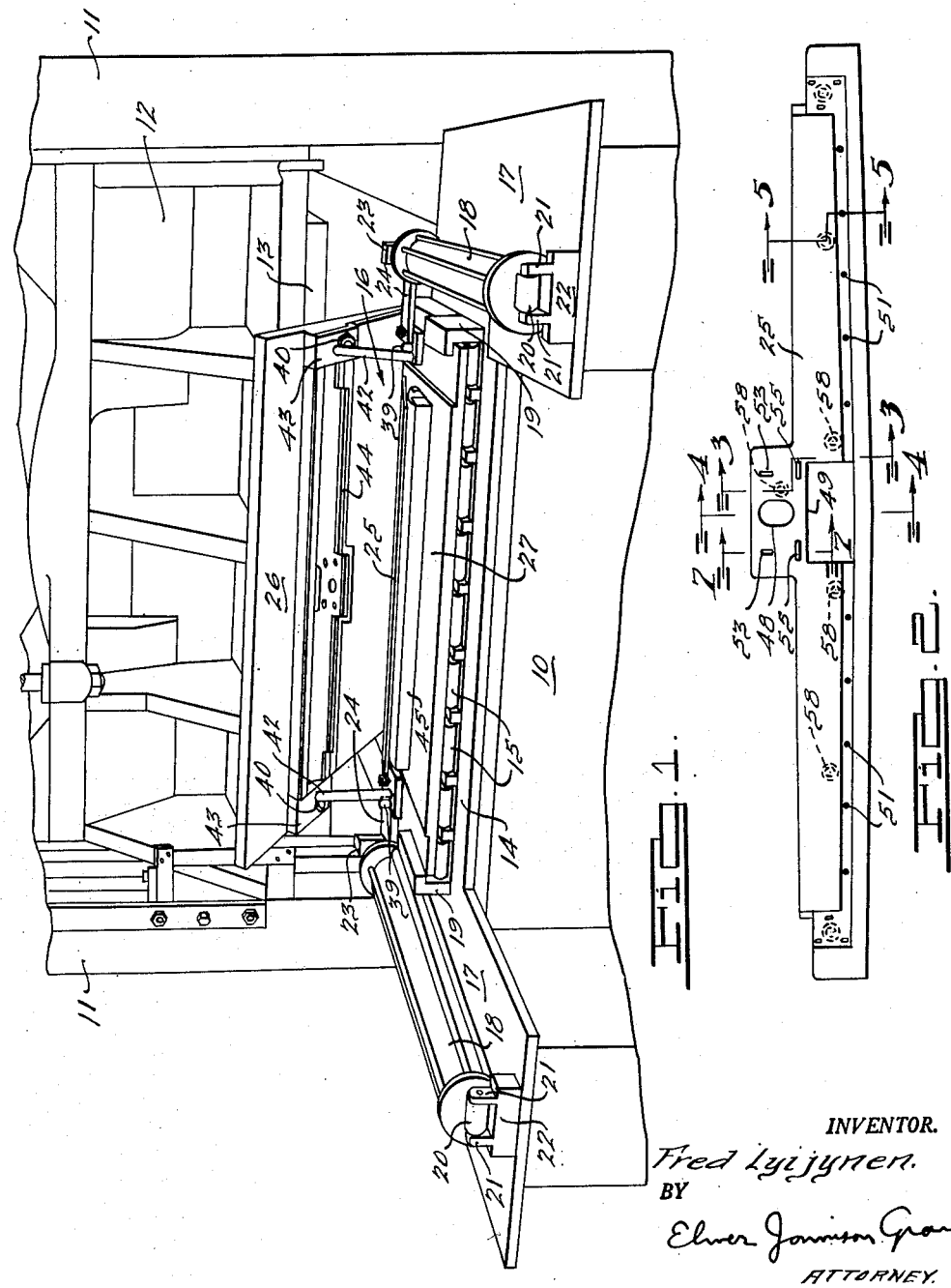

July 2, 1957  F. LYIJYNEN  2,797,437
MOLDING APPARATUS

Original Filed April 17, 1946  4 Sheets-Sheet 3

INVENTOR.
Fred Lyijynen,
BY
ATTORNEY.

July 2, 1957 F. LYIJYNEN 2,797,437
MOLDING APPARATUS
Original Filed April 17, 1946 4 Sheets-Sheet 4
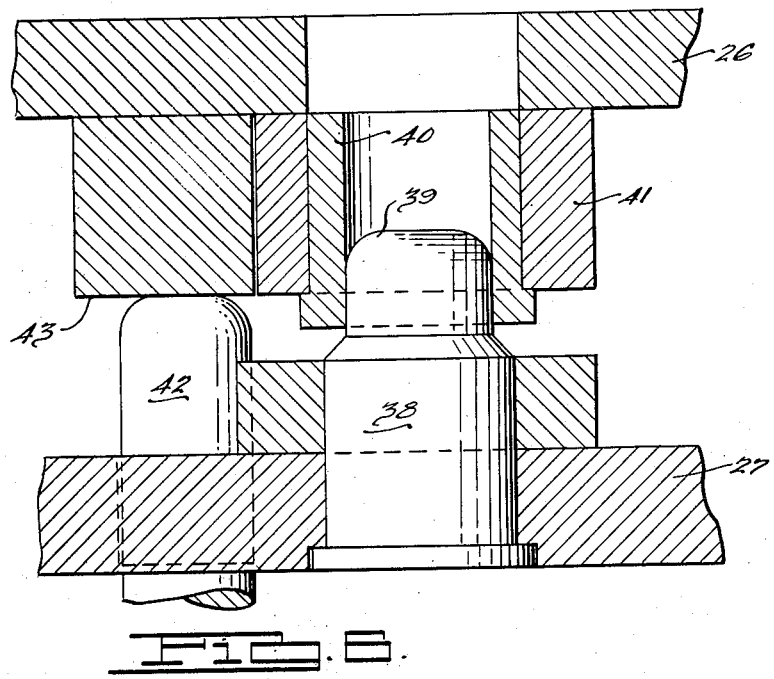
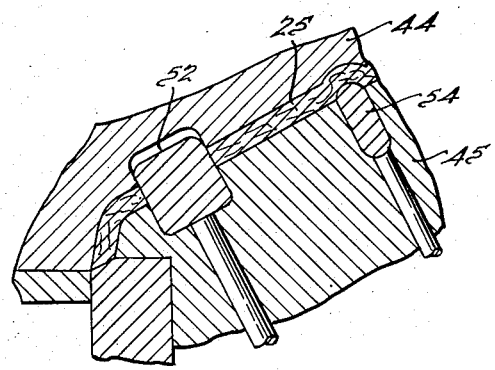
INVENTOR.
Fred Lyijynen.
BY
ATTORNEY.

United States Patent Office 2,797,437
Patented July 2, 1957

2,797,437
MOLDING APPARATUS

Fred Lyijynen, Detroit, Mich., assignor, by mesne assignments, to Chrysler Corporation, a corporation of Delaware Original application April 17, 1946, Serial No. 662,840, now Patent No. 2,565,248, dated August 21, 1951. Divided and this application January 12, 1951, Serial No. 205,680

4 Claims. (Cl. 18—16)

This invention relates to the manufacture of plastic articles and more particularly to an improved molding apparatus for forming such articles under heat and pressure. This application is a division of my copending application filed April 17, 1946, Serial No. 662,840, now Patent No. 2,565,248.

The present invention is particularly useful in connection with the molding under heat and pressure of irregularly shaped articles, such as instrument panels and trim panels applicable to the interiors of automobile bodies, and has for an important object the provision of mechanism of improved nature for molding or forming the panels rapidly and efficiently on a volume basis thereby reducing costs materially and increasing the productive capacity of each press used in carrying out the molding operations.

Another object of the invention is to provide an improved mold having an upper hinged section which, when closed down onto the lower mold section, is capable of yielding movement or articulation so as to conform automatically to changing contours of the charge within the mold and to ensure accurate mating of the mold sections when brought together.

A further object of the invention is to provide improved means for opening the mold sections, for ejecting the finished articles from the molds when opened outside the press, and also, where desired, for molding fastener elements into the article through the medium of which the finished article may later be readily attached to its supporting structure.

Other objects of this invention will appear in the following description and appended claims, reference being had to the accompanying drawings forming a part of this specification wherein like reference characters designate corresponding parts in the several views.

Fig. 1 is a fragmentary perspective view of a press embodying the present invention, illustrating at one open side of the press a mold unit in retracted position and open for the purpose of charging the same.

Fig. 2 is a top plan view of an instrument panel for an automobile body, produced in a mold embodying the present invention.

Fig. 3 is an enlarged fragmentary section taken through the mold unit substantially along lines 3—3 of Fig. 2 when the panel therein shown is positioned within the mold unit.

Fig. 6 is an enlarged fragmentary section taken through the mold unit at the locality of the pneumatic means for opening the mold.

Fig. 7 is an enlarged fragmentary section taken through the mold unit substantially along lines 7—7 of Fig. 2 when the panel therein shown is positioned within the mold unit.

Figure 4:
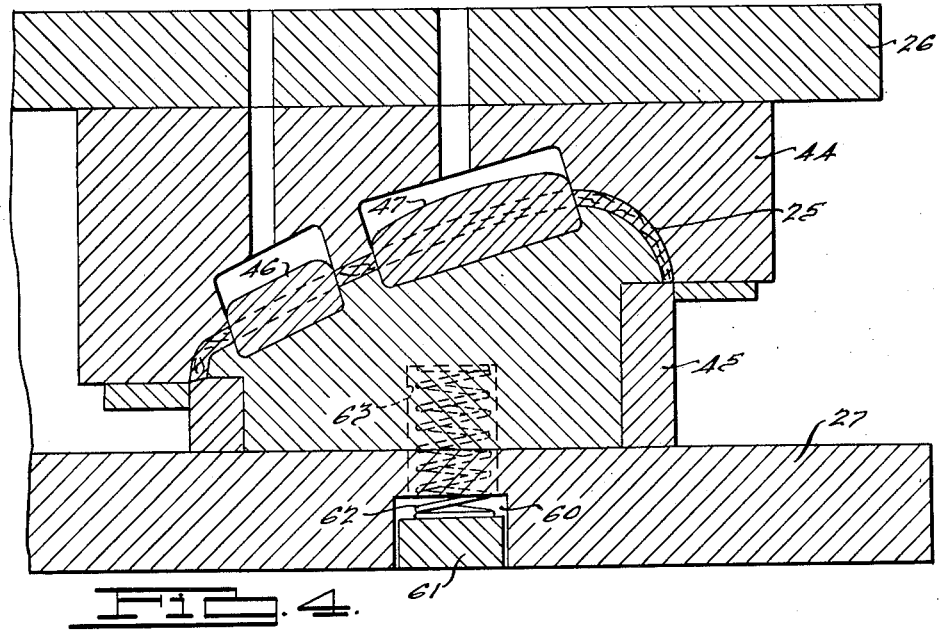
Fig. 4 is an enlarged fragmentary section taken through the mold unit substantially along lines 4—4 of Fig. 2 when the panel therein shown is positioned within the mold unit.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

An application of the present invention is illustrated by way of example with a hydraulic type press, Fig. 1, comprising a lower frame or housing 10 within which are contained operating and control mechanisms, including pneumatic means for actuating various piston rods discussed hereinafter, as well as the automatic controls therefor. The frame 10 also comprises a number of upright columns 11 which support a fixed upper cross head 12. Rigidly attached to the bottom of this cross head is an upper fixed heated platen 13. Arranged below the platen 13 is a vertically movable heated lower platen (not shown) which is moved vertically in the pressing cycle by means of a hydraulic ram contained within the frame or housing 10. The press construction may be conventional if desired and is accordingly not discussed in further detail. Although only two platens are mentioned, it will be apparent from the following that the present invention is applicable for use with multiple platen presses, as described in my aforesaid copending application for example.

Mounted on the frame housing 10 forward of the press is a platform or table 14 carrying sets of anti-friction rollers 15 on which a mold unit indicated generally by the numeral 16 in Fig. 1 is shiftable into and out of loading position. The guide platform 14 is provided at opposite sides with platform extension 17 adapted to support a pair of pneumatic cylinders 18. The table 14 is provided with suitable side guides 19 in order to guide the mold unit 16 into its proper position within the press. For the similar purpose other side guides may also be provided on the platens.

Each pneumatic cylinder 18 is formed at its outer end with a boss 20 carrying a horizontal pivot pin journalled within a pair of spaced lugs 21 secured to a block 22 rigidly mounted on the platform extension 17. This construction provides a swivel mounting for the outer end of each pneumatic cylinder, enabling it to swing vertically about a horizontal axis in order to compensate for the vertical movement of the mold unit during operation of the press. The pneumatic cylinder 18 is provided with a piston rod which in the usual manner is attached to a reciprocable piston within the cylinder. The outer end of each piston rod has a suitable articulated connection with a corresponding projecting lug or bracket 23 which in turn is secured to the adjacent lower portion of the mold unit by a transverse connecting shaft member 24, whereby the mold unit may be fed in a straight line path into and out of the press upon operation of the pneumatic mechanism.

In the illustrated embodiment of the invention each mold unit is designed to form a single article, such as an instrument panel 25. It will be understood, however, that a wide variety of articles may be molded and each mold unit may be constructed to mold one or a plurality of similar or different articles. The plastic materials which I use preferably are composed of one or more thermosetting resins as the principal constituent thereof which may be combined with a suitable reinforcing filler of fibrous nature. Typical thermosetting resins which have been used satisfactorily are the phenol-formaldehyde, urea formaldehyde and melamine type resins.

In Fig. 1, only a single mold unit 16 is illustrated by way of example in the open or loading position, withdrawn from the press and resting on the rollers 15. It will be understood however that other similar mold units shiftable into and out of the press from other sides thereof will be employed where desired, permitting one or more mold units to be loaded and unloaded exteriorly of the press while another mold is subjected to a pressing operation between the press platens.

As illustrated particularly in Figs. 3–7, the mold unit 16 comprises an upper platen or mold section 26 and a lower platen or mold section 27. The upper section 26 is provided at its inner end at opposite sides with a pair of depending hinge members 28, Fig. 3, each member having a sliding fit within a bifurcated or vertically slotted hinge member 29 rigidly secured to the inner end of the lower mold section 27. Each mating pair of hinge members 28 and 29 is connected together by means of a transverse hinge pin 30 secured to the hinge member 28 and slidable within a vertical guide slot 31 in the hinge member 29. In advance of each pair of hinge members is an equalizer pin or plunger 32 engageable at its upper end with the bottom of the mold section 26. Each plunger 32 is slidable vertically within a guide hole in a block 33 and terminates in a head 34 slidable within a cylindrical hole 35 in the block. The plunger 32 is urged upwardly by means of a compression spring 36 which is bottomed within a hole 37 in the mold section 27.

Rigidly secured to the lower mold section 27 near opposite sides thereof and in advance of the hinged ends of the mold section are a pair of locating studs 38, Figs. 1 and 6, terminating in rounded reduced ends 39 engageable within socket members 40. The latter are secured within holes in blocks 41 which are rigidly attached to the bottom of the mold section 26. Thus, when the upper mold section 26 is swung downward to a closed position, the socket members 40 will fit over the guide portions 39 of the locating studs 38 and accurately position the mold section 26 when the latter is closed. It is apparent from the foregoing that the upper mold platen or section 26 is carried by the lower mold platen or section 27, which in turn rides on the rollers 15 and is connected to the transverse shafts 24 at opposite sides, whereby the mold unit 16 is shifted to and from the pressing position between the press platens by hydraulic actuation of the cylinders 18.

Adjacent each locating stud 38 is a vertically reciprocable pneumatically actuated plunger 42 which passes freely through a hole in the lower mold section 27 and engages a bearing block 43 secured to the bottom of the upper mold section 26. After the mold 16 has been withdrawn from the press to the position shown in Fig. 1, the plungers 42 are shifted upwardly, thereby swinging the mold section 26 about its hinge connection into open position so as to permit removal of the molded article 25. It will be understood that the plungers 42 are connected at their lower ends beneath the platform 14 to pneumatically operated pistons reciprocable within air cylinders (not shown).

Figure 5:
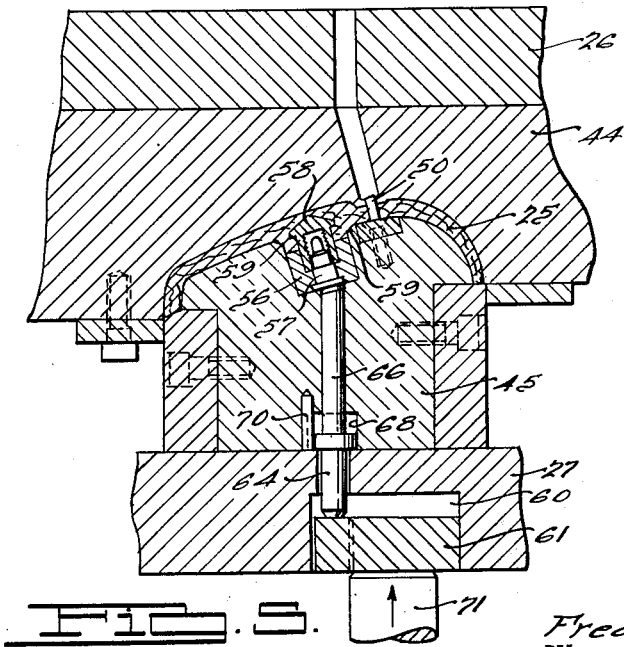
Fig. 5 is an enlarged fragmentary section taken through the mold unit substantially along lines 5—5 of Fig. 2 when the panel therein shown is positioned within the mold unit.

Referring to Figs. 3–5 and 7, the mold unit 16 also comprises an upper die 44 rigidly secured to the underside of the platen 26, and a lower die 45 secured to the lower platen 27. The dies 44 and 45 are suitably contoured so as to mold the plastic charge to the shape of the article 25. As shown in Fig. 4 the lower die 45 carries fixed punch inserts 46 and 47 adapted to project into recesses in the upper die and to pierce or punch out openings 48 and 49, Fig. 2, in the panel 25. As shown in Fig. 5, the lower die 45 also carries a number of fixed punches 50, ten in the present instance, which are adapted to punch a series of ten holes 51 in the instrument panel 25. The lower die 45 also carries two fixed punches 52, Fig. 7, which are adapted to pierce two slots 53 in the instrument panel, Fig. 2. Also carried by the lower die, Fig. 7, are two fixed embossing inserts 54 adapted to form embossments 55 in the instrument panel.

In the present embodiment of the invention, the mold mechanism is constructed so as to mold into the underside of the panel 25 a number of fastener elements which are placed in position on the lower die before the charge of plastic material in the form of a plurality of superimposed sheets is placed over the die preparatory to closing of the mold units. Referring to Figs. 3 and 5, seven metallic socket inserts 56 are mounted in recesses in the lower die 45. Secured within each of these inserts 56 is a locating stud 57, the outer end of which is shaped to receive and position a fastener element 58. As illustrated, each fastener element is formed with a head and a cylindrical shank provided with a threaded hole into which the end of the locating stud 57 projects when the fastener element is placed in position. During the molding operation an upwardly projecting portion of each fastener element 58 is molded into and embedded within a thickened or embossed portion 59 at the underside of the panel 25. When the panel is removed after completion of the molding operation, a portion of the fastener element 58 will project below the panel. Any suitable number of fastener elements 58 may be molded into the underside of the panel 25, these elements being suitably located so as to receive attaching screws when the panel is mounted on the automobile body frame structure.

As illustrated in Figs. 3 through 5, a pneumatically operated ejector mechanism is provided for freeing the finally formed panel 25 from the lower die 45 after the mold 16 has been opened in the manner shown in Fig. 1. Mounted within a recess 60 in the bottom of the platen 27 is an ejector bar 61. This bar is permitted a limited amount of vertical movement within the recess against the action of a compression spring 62, Fig. 4, which extends through a hole in the platen 27 and into a recess 63 in the die member 45. The ejector bar 61 engages a number of vertically extending pins 64 which are freely slidable within holes in the platen 27. As shown in Fig. 3, the pin 64 engages the head of a knock-out pin 65 which at its upper end engages the head of the locating stud 57. In Fig. 5 the pin 64 engages a longer knock-out pin 66, which in turn contacts the head of the locating stud 57.

In the manufacture of the panel 25 which is provided with seven fastener elements and a corresponding number of locating studs 57, I prefer to provide a corresponding number of knock-out pins 65, 66 which are of suitable length to extend a sufficient distance through the die 45 to engage the bottoms of the locating studs 57, these knock-out pins being freely slidable in holes in the die 45 and terminating at their lower ends in annular heads slidable within corresponding recesses 67, 68 in the bottom of the die 45. As shown in Figs. 3 and 5, locking pins 69 and 70 project into notches in the heads of the knock-out pins 65 and 66 respectively so as to prevent turning thereof and thereby to maintain the upper tapered ends of the knock-out pins 65, 66 in proper engagement with the lower ends of the locating studs 57.

From the foregoing, it is seen that the locating studs 57 which are mounted within the socket members 56, the latter in turn being slidable within recesses in the die 45, are utilized as contact media for the knock-out pins 65 and 66 when the latter are shifted upwardly to free the panel 25 from the die 45. It will be understood that the ejector bar 61 and the recess 60 are shaped so as to engage all of the pins 64. Accordingly the bar 61 has an extended portion 61a, Fig. 3, enabling engagement thereof with the pin 64 which is associated with the fastener element 58 arranged out of line with the other fasteners 58, Fig. 2. The ejector bar 61 is shifted vertically to actuate the knock-out pins by a plurality of plungers 71 which are connected to pistons reciprocable within air cylinders arranged within the housing 10 beneath the platform 14, the plungers 71 being shiftable vertically through holes in the platform 14 and the anti-friction roller mechanism mounted thereon.

In operation, while the press jaws are separated and the mold unit 16 is in the open position and withdrawn from the press, Fig. 1, the plastic material to be formed into the panel 25 is arranged between the dies 44 and 45. Thereafter the pneumatically actuated plungers 42 are retracted, allowing the upper mold section or platen 26 to swing downward about the axis of the hinge pins 30. As the platen 26 approaches the closed position, Fig. 6, the guide elements 39 enter the guide sockets 40 and position the platen 26 and die elements 44 and 45 accurately with respect to each other in the final or closed position. The plunger 42 is then withdrawn below the lower mold section or platen 27. Thereafter the pneumatic cylinders 18 are actuated simultaneously to move the mold unit 16 between the heated platens of the press as aforesaid. Upon completion of the pressing operation, the mold unit is withdrawn from the press on the rollers 15 by retraction of the plungers of the cylinders 18. The plungers 42 are then extended to raise the upper mold platen 26 to the position of Fig. 1, whereupon the molded panel 25 is loosened from the mold 45 as described above upon extension of the plungers 71 upward against the bar 61. In this action, the bar 61 is moved upward against the plungers 64, which in turn drive the knock-out pins 65, 66 upward against the locating studs 57. The panel 25 is then taken from the press and the studs 57 removed from the threaded sockets of the fasteners 58. Upward movement of the lower mold section or platen 27 with the plungers 71 is prevented by the lateral guides 19, Fig. 1, which overlie the adjacent ends of the mold platen 27.

I claim:

1. In combination with a press, a mold unit shiftable between a pressing position within said press and a loading position out of said press and comprising a lower platen and a vertically swinging upper platen overlying the lower platen when said unit is closed, hinge means connecting said platens and having vertical lost motion, means adjacent said hinge means yieldingly urging vertical separation of said platens at the hinge means when said unit is closed, a vertically reciprocable plunger having an upper end registering with an overlying plunger engaging portion of said upper platen when said unit is closed at said loading position, said plunger being shiftable upwardly to swing said upper platen to an open position by engagement with said overlying plunger engaging portion, and means for reciprocating said mold unit between said pressing and loading positions when said plunger is retracted and said unit is closed.

2. In combination with a press, a mold unit shiftable between a pressing position within said press and a loading position out of said press and comprising a lower platen and a vertically swinging upper platen overlying the lower platen when said unit is closed, hinge means connecting said platens and having vertical lost motion, means adjacent said hinge means yieldingly urging vertical separation of said platens at the hinge means when said unit is closed, a vertically reciprocable plunger having an upper end adapted to extend upwardly through an opening in said lower platen when said unit is closed at said loading position, said plunger being shiftable upwardly into engagement with a portion of said upper platen thereby to swing said upper platen to an open position, and means for reciprocating said mold unit between said pressing and loading positions when said unit is closed and after retraction of said plunger downwardly to withdraw the upper end thereof from said opening in the lower platen and out of the path of reciprocation of said mold unit.

3. In combination with a press, a mold unit shiftable between a pressing position within said press and a loading position out of said press and comprising a lower platen and a vertically swinging upper platen overlying the lower platen when said unit is closed, hinge means connecting said platens and having vertical lost motion, said hinge means comprising laterally spaced hinge pins each carried by one platen and shiftable vertically within a slot in a portion of the other platen, means adjacent said hinge means yieldingly urging vertical separation of said platens at the hinge means when said unit is closed, a vertically reciprocable plunger having an upper end registering with an overlying plunger engaging portion of said upper platen when said unit is closed at said loading position, said plunger being shiftable upwardly to swing said upper platen to an open position by engagement with said overlying plunger engaging portion, and means for reciprocating said mold unit between said pressing and loading positions when said plunger is retracted and said unit is closed.

4. In combination with a press, a mold unit shiftable between a pressing position within said press and a loading position out of said press and comprising a lower platen and a vertically swinging upper platen overlying the lower platen when said unit is closed, hinge means connecting said platens and having vertical lost motion, said hinge means comprising laterally spaced hinge pins each carried by one platen and shiftable vertically within a slot in a portion of the other platen, means adjacent said hinge means yieldingly urging vertical separation of said platens at the hinge means when said unit is closed, a vertically reciprocable plunger having an upper end adapted to extend upwardly through an opening in said lower platen when said unit is closed at said loading position, said plunger being shiftable upwardly into engagement with a portion of said upper platen thereby to swing said upper platen to an open position, and means for reciprocating said mold unit between said pressing and loading positions when said unit is closed and after retraction of said plunger downwardly to withdraw the upper end thereof from said opening in the lower platen and out of the path of reciprocation of said mold unit.

References Cited in the file of this patent

UNITED STATES PATENTS

| | | |
|---|---|---|
| 1,388,138 | Atcheson | Aug. 16, 1921 |
| 1,740,065 | Bostwick | Dec. 17, 1929 |
| 1,775,812 | Church | Sept. 16, 1930 |
| 1,892,942 | Gammeter | Jan. 3, 1933 |
| 2,171,511 | Winegar et al. | Aug. 29, 1939 |
| 2,186,882 | Rawls et al. | Jan. 9, 1940 |
| 2,197,849 | Burroughs | Apr. 23, 1940 |
| 2,272,231 | Voth | Feb. 10, 1942 |
| 2,304,984 | Wood | Dec. 15, 1942 |
| 2,325,752 | Dodge | Aug. 3, 1943 |
| 2,365,764 | Kastner | Dec. 26, 1944 |
| 2,382,200 | Brunner | Aug. 14, 1945 |
| 2,428,664 | Gregg | Oct. 7, 1947 |
| 2,443,573 | Brundage | June 15, 1948 |
| 2,449,133 | Lyijynen | Sept. 14, 1948 |
| 2,489,486 | Glynn | Nov. 29, 1949 |
| 2,508,522 | Kastner | May 23, 1950 |
| 2,655,710 | Roensch et al. | Oct. 20, 1953 |

FOREIGN PATENTS

| | | |
|---|---|---|
| 105,854 | Australia | Nov. 16, 1938 |